(12) United States Patent
Fan (10) Patent No.: US 9,399,380 B1
(45) Date of Patent: Jul. 26, 2016

(54) VIBRATION-TYPE ELECTRIC GENERATOR APPLIED TO AUTOMOBILE SUSPENSION SYSTEM

(71) Applicant: Ping Fan, New Taipei (TW)

(72) Inventor: Ping Fan, New Taipei (TW)

( * ) Notice: Subject to any disclaimer, the term of this patent is extended or adjusted under 35 U.S.C. 154(b) by 0 days.

(21) Appl. No.: 14/689,457

(22) Filed: Apr. 17, 2015

(51) Int. Cl.
| | | |
|---|---|---|
| *F02B 63/04* | (2006.01) |
| *F03G 7/08* | (2006.01) |
| *H02K 7/18* | (2006.01) |
| *B60G 13/14* | (2006.01) |
| *B60G 13/08* | (2006.01) |
| *H02K 7/06* | (2006.01) |
| *B60G 11/02* | (2006.01) |
| *F16D 27/00* | (2006.01) |

(52) U.S. Cl.
CPC .............. *B60G 13/14* (2013.01); *B60G 13/08* (2013.01); *H02K 7/06* (2013.01); *H02K 7/1853* (2013.01); *B60G 2202/24* (2013.01); *B60G 2300/60* (2013.01); *B60G 2500/10* (2013.01)

(58) Field of Classification Search
USPC .................. 290/1 R; 280/124.174; 192/21.5; 188/267, 267.1, 267.2; 180/165
See application file for complete search history.

(56) References Cited

U.S. PATENT DOCUMENTS

| | | | | | |
|---|---|---|---|---|---|
| 4,032,829 A | * | 6/1977 | Schenavar | .............. | B60G 13/14 180/65.31 |
| 4,295,538 A | * | 10/1981 | Lewus | .................... | B60G 13/14 180/165 |
| 4,815,575 A | * | 3/1989 | Murty | ................ | B60G 17/0157 188/266.1 |
| 4,892,328 A | * | 1/1990 | Kurtzman | .......... | B60G 17/0157 188/267 |
| 4,896,754 A | * | 1/1990 | Carlson | .................. | F16D 37/008 188/267.1 |
| 5,090,531 A | * | 2/1992 | Carlson | .................. | F16D 37/008 188/267.1 |
| 5,573,088 A | * | 11/1996 | Daniels | .............. | B60G 17/0157 188/267 |
| 5,590,734 A | * | 1/1997 | Caires | .................... | B60G 13/14 180/165 |
| 5,775,469 A | * | 7/1998 | Kang | ...................... | F16F 15/03 188/162 |
| 5,850,110 A | * | 12/1998 | Kroger | .................... | H02K 7/061 209/367 |
| 6,202,806 B1 | * | 3/2001 | Sandrin | .............. | A63B 21/0056 188/267 |
| 6,336,535 B1 | * | 1/2002 | Lisenker | ................. | F16F 9/535 188/267 |
| 6,747,383 B2 | * | 6/2004 | Tornquist | ................ | F16C 25/08 310/156.16 |
| 6,920,951 B2 | * | 7/2005 | Song | ...................... | B60K 25/10 180/165 |
| 6,926,500 B2 | * | 8/2005 | Ferullo | .................. | B64C 27/51 188/267.1 |

(Continued)

*Primary Examiner* — Pedro J Cuevas
(74) *Attorney, Agent, or Firm* — Bacon & Thomas, PLLC (57) ABSTRACT

The present invention is to provide a vibration-type electric generator, which comprises an electric generator fixed on an automobile, having stators fixed at the inner rim of the generator, and having rotors rotatably installed inside the generator, such that when the rotors are rotated, the rotors generate a time-varying magnetic field to induce electricity on the stators; two one way bearings having shafts fixedly linked to a shaft of the rotors, respectively, such that when the bearings are respectively driven to rotate toward the same direction, the rotors are driven simultaneously to rotate toward the same direction and subsequently generate the electricity on the stators; and a hydraulic system pivotally connected to two suspension members on the automobile which are able to generate relative movement in response to the vibration of the automobile, so as to subsequently generate two forces for driving the bearings to rotate toward the same direction.

13 Claims, 8 Drawing Sheets

(56) References Cited

U.S. PATENT DOCUMENTS

| | | | | |
|---|---|---|---|---|
| 6,952,060 B2* | 10/2005 | Goldner | B60G 17/0157 | 310/12.13 |
| 7,051,849 B2* | 5/2006 | Browne | F16F 9/535 | 188/266.4 |
| 7,087,342 B2* | 8/2006 | Song | B60G 13/14 | 180/65.1 |
| 7,225,905 B2* | 6/2007 | Namuduri | F16F 9/535 | 188/267.1 |
| 7,250,697 B2* | 7/2007 | Beaulieu | B60G 13/14 | 310/12.12 |
| 7,261,171 B2* | 8/2007 | de la Torre | B60K 25/10 | 180/165 |
| 7,617,032 B2* | 11/2009 | Izawa | B60G 11/14 | 188/267.2 |
| 7,624,850 B2* | 12/2009 | Namuduri | F16F 9/535 | 188/267.2 |
| 7,885,740 B2* | 2/2011 | Izawa | B60G 11/14 | 188/267.2 |
| 7,938,217 B2* | 5/2011 | Stansbury, III | F03G 7/08 | 180/165 |
| 7,942,225 B2* | 5/2011 | Carabelli | B60G 13/14 | 180/165 |
| 7,994,648 B1* | 8/2011 | Fielek | B60G 13/14 | 290/1 R |
| 8,127,900 B2* | 3/2012 | Inoue | B60G 13/16 | 188/266.1 |
| 8,261,865 B2* | 9/2012 | Stansbury, III | B60K 25/10 | 180/65.31 |
| 8,424,656 B2* | 4/2013 | Hiemenz | F16F 9/3415 | 188/267.2 |
| 8,430,416 B2* | 4/2013 | Battlogg | F16F 9/535 | 188/267 |
| 8,448,952 B2* | 5/2013 | Serbu | B60G 17/0195 | 188/267 |
| 8,668,215 B2* | 3/2014 | Juriga | B60G 11/113 | 180/348 |
| 8,757,652 B2* | 6/2014 | Battlogg | F16F 9/535 | 188/267 |
| 8,770,358 B2* | 7/2014 | Nakajima | F16F 9/3482 | 188/267.2 |
| 8,807,258 B2* | 8/2014 | Stansbury, III | B60K 25/10 | 180/165 |
| 8,840,118 B1* | 9/2014 | Giovanardi | F15B 13/0444 | 280/124.157 |
| 8,841,786 B2* | 9/2014 | Tucker | F01C 1/103 | 290/1 R |
| 8,882,120 B2* | 11/2014 | Juriga | B60G 9/00 | 267/260 |
| 8,919,795 B2* | 12/2014 | Juriga | B60G 9/00 | 267/260 |
| 9,030,033 B2* | 5/2015 | Yoo | B60G 7/02 | 180/165 |
| 9,245,454 B2* | 1/2016 | Kim | F16D 57/002 | |
| 9,260,185 B2* | 2/2016 | Covington | B64C 27/51 | |
| 9,270,153 B2* | 2/2016 | Yoo | H02K 7/1853 | |
| 2003/0030523 A1* | 2/2003 | Bell | B60G 13/14 | 335/220 |
| 2003/0189382 A1* | 10/2003 | Tornquist | F16C 25/08 | 310/90 |
| 2004/0119289 A1* | 6/2004 | Zabramny | H02J 7/32 | 290/1 R |
| 2005/0121269 A1* | 6/2005 | Namuduri | F16F 9/53 | 188/267.1 |
| 2007/0089919 A1* | 4/2007 | de la Torre | B60K 25/10 | 180/65.31 |
| 2007/0089924 A1* | 4/2007 | de la Torre | B60G 13/14 | 180/305 |
| 2008/0257626 A1* | 10/2008 | Carabelli | B60G 13/14 | 180/165 |
| 2009/0121398 A1* | 5/2009 | Inoue | B60G 13/16 | 267/140.14 |
| 2009/0218443 A1* | 9/2009 | Wereley | B64C 27/51 | 244/99.8 |
| 2010/0281858 A1* | 11/2010 | Stansbury, III | B60K 25/10 | 60/327 |
| 2011/0155841 A1* | 6/2011 | Cranga | B64C 27/001 | 244/17.11 |
| 2012/0013277 A1* | 1/2012 | Ogawa | B60G 17/08 | 318/368 |
| 2012/0146339 A1* | 6/2012 | Lee | H02K 7/1846 | 290/1 C |
| 2012/0313575 A1* | 12/2012 | Stansbury, III | B60K 25/10 | 320/107 |
| 2013/0147205 A1* | 6/2013 | Tucker | F01C 1/103 | 290/1 A |
| 2013/0154280 A1* | 6/2013 | Tucker | F01C 1/103 | 290/1 R |
| 2014/0132007 A1* | 5/2014 | Yoo | B60G 7/02 | 290/1 C |
| 2014/0182955 A1* | 7/2014 | Yoo | B60G 7/006 | 180/65.31 |
| 2014/0183873 A1* | 7/2014 | Yoo | F03G 7/08 | 290/1 C |
| 2014/0260233 A1* | 9/2014 | Giovanardi | F15B 13/0444 | 60/431 |
| 2014/0265168 A1* | 9/2014 | Giovanardi | F15B 13/0444 | 280/5.5 |
| 2014/0265169 A1* | 9/2014 | Giovanardi | F15B 13/0444 | 280/5.5 |
| 2014/0265170 A1* | 9/2014 | Giovanardi | F15B 13/0444 | 280/5.5 |
| 2014/0353060 A1* | 12/2014 | Stansbury, III | B60K 25/10 | 180/165 |
| 2016/0068072 A1* | 3/2016 | Fan | B60L 11/1809 | 180/55 |

\* cited by examiner

VIBRATION-TYPE ELECTRIC GENERATOR APPLIED TO AUTOMOBILE SUSPENSION SYSTEM

FIELD OF THE INVENTION

The present disclosure relates to an electric generator, more particularly to a vibration-type electric generator applied to an automobile suspension system.

BACKGROUND OF THE INVENTION

Since a vehicle has been equipped with more and more diversified interior functions in the past few decades, the electricity consumed by the vehicle has also significantly increased. Twenty years ago, the power of electric generators for common medium-sized automobiles took approximately 500 W, which has risen to 1000 W nowadays. It clearly demonstrates the rising trend in automobile power consumption. This means more fuel consumption by the automobile (to drive the electric generator) and more greenhouse gases produced, which is detrimental to the environment and ecology. Although hybrid electric vehicles and electric automobiles have already been designed presently, they face difficulties in prevalence due to the problems of high production cost and few charging station deployment.

Figure 1:
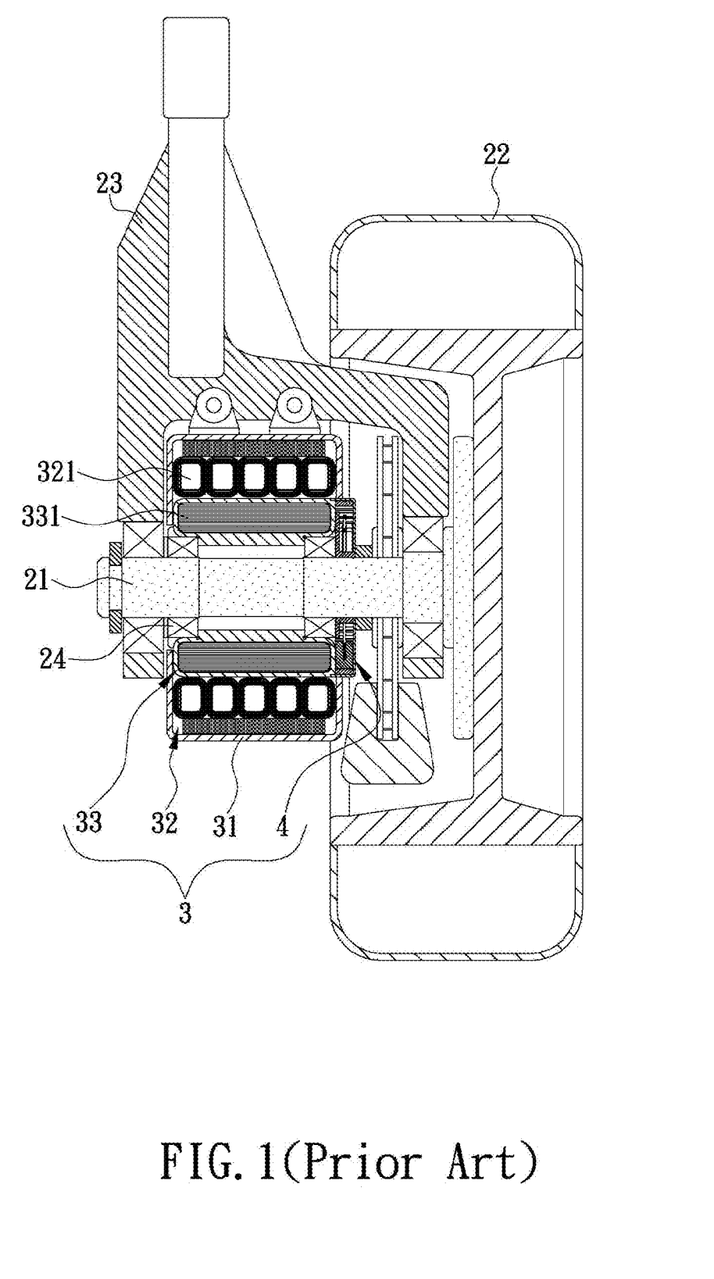
FIG. 1 is a schematic view of a clutch-type electric generator in prior art.

With respect to the above mentioned problems, the inventor of the present invention has ever invented a clutch-type electric generator capable of being applied to axles of conventional automobiles, hybrid electric automobiles or electric automobiles, as shown in FIG. 1 of the present invention, so as to enhance the energy utilization efficiency of the automobile and, in the meantime, to enable the automobile to actively utilize the kinetic energy while driving to achieve the dual purposes of "saving energy" and "generating electricity". Please refer to FIG. 1 again, the clutch-type electric generator 3 is installed on an automobile and comprises a casing 31, a stator base 32, a rotor base 33 and a clutch mechanism 4, wherein an outer rim of the casing 31 is fixed to a suspension device 23 of the automobile, the casing 31 is configured with a containing space inside which is configured with holes at the front end and the rear end, respectively, and an axle 21 of the automobile penetrates the casing 31 via the holes and rotates with respect to the casing 31, and the containing space contains the stator base 32, the rotor base 33 and the clutch mechanism 4. The stator base 32 is fixed to an inner rim of the casing 31 and comprises a plurality of stators 321 (such as coils) disposed along the perimeter of the axle 21 which is electrically connected to a power module of the automobile. The rotor base 33 is movably disposed around an outer rim of the axle 21 through a bearing 24 and is positioned between the stator base 32 and the axle 21, wherein the rotor base 33 comprises a plurality of rotors 331 (such as field magnets) also disposed along the perimeter of the axle 21, each of the plurality of rotors 331 correspond to each of the plurality of stators 321, respectively, and keeps a predetermined gap with each of the plurality of stators 321.

Figure 2:
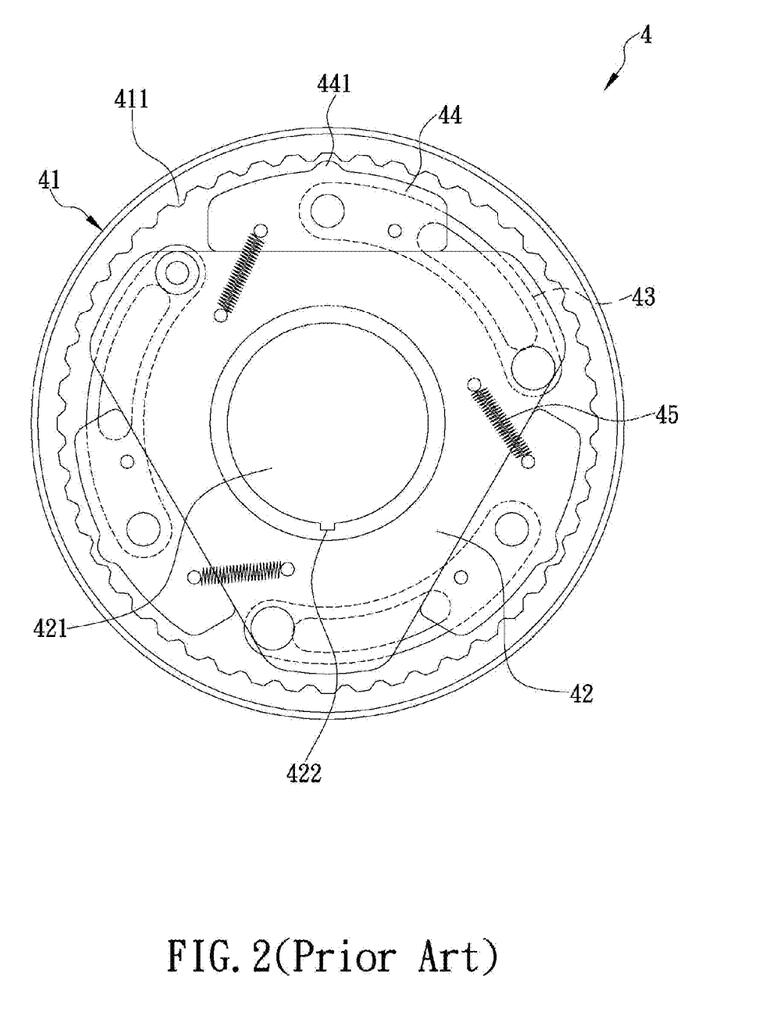
FIG. 2 is a schematic view of a clutch mechanism of the clutch-type electric generator shown in FIG. 1.

Please refer to FIGS. 1 and 2, the clutch mechanism 4 is installed within the casing 31 at a position near a wheel 22 of the automobile and comprises a passive ring 41, a clutch disc 42, a plurality of connecting rods 43, a plurality of clutch shoes 44 and a plurality of elastic devices 45, wherein a side of the passive ring 41 is concentrically fixed on a side of the rotor base 33 so that the passive ring 41 and the rotor base 33 simultaneously rotate with respect to the axle 21 as a rotating center, and an inner rim of the passive ring 41 is configured with a plurality of first engagement parts 411 along the perimeter thereof. The clutch disc 42 is positioned in a hollow portion of the passive ring 41, and a penetrating hole 421 is configured at the center of the clutch disc 42, wherein the penetrating hole 421 is configured with an engagement groove 422, so that the axle 21 penetrates the penetrating hole 421 and engages with the engagement groove 422 for enabling the clutch disc 42 to simultaneously rotate along with the axle 21. An end of each of the plurality of connecting rods 43 is pivotally connected to the clutch disc 42, and a middle section of each of the plurality of clutch shoes 44 is pivotally connected to the other end of each of the plurality of connecting rods 43, respectively, to move between an outer rim of the clutch disc 42 and the inner rim of the passive ring 41, wherein each of the plurality of clutch shoes 44 is configured with a second engagement part 441 corresponding to each of the plurality of first engagement parts 411. Each of the plurality of elastic devices 45 has an end connected to the clutch disc 42 and the other end correspondingly connected to each of the plurality of clutch shoes 44, respectively, to apply elastic force on the plurality of clutch shoes 44 so that a side of each of the plurality of clutch shoes 44 opposite to the second engagement part 441 presses against the outer rim of the clutch disc 42 to keep a predetermined distance between each of the plurality of first engagement parts 411 and each of the plurality of second engagement parts 441.

Thus, when the clutch disc 42 is simultaneously rotated by the axle 21 in a speed (i.e., the rotation speed of the axle 21 or the wheel 22) unable to generate a sufficient centrifugal force for the plurality of clutch shoes 44 to overcome the elastic force, the plurality of first engagement parts 411 does not engage and mesh with the corresponding plurality of second engagement parts 441 and thus the passive ring 41 along with the rotor base 33 do not rotate along with the axle 21 (as shown in FIG. 2); in other words, the kinetic energy generated by the automobile at this time does not simultaneously drive the rotor base 33. On the contrary, when the rotation speed of the clutch disc 42 (i.e., the rotation speed of the axle 21 or the wheel 22) is higher enough to generate a sufficient centrifugal force for the plurality of clutch shoes 44 to overcome the elastic force, an outer rim of the each of the plurality of clutch shoes 44 is pressed against the inner rim of the passive ring 41 by the centrifugal force, so that the plurality of second engagement parts 441 engages and meshes with the corresponding plurality of first engagement parts 411, and the passive ring 41 along with the rotor base 33 are then rotating along with the axle 21; at this time, the plurality of rotors 331 on the rotor base 33 rotates along with the axle 21 as the rotating center and generates a time-varying magnetic field and subsequently generates induced electricity on the plurality of stators 321, where the induced electricity is stored in the power module.

Though the clutch-type electric generator 3 can be easily installed in any types of automobiles without changing the frame structures thereof, however, since the clutch-type electric generator 3 is only being activated to generate electricity through utilizing the kinetic energy of the axle 21 when the automobile is running in a high speed (such as above 20 km per hour). In case, the automobile is only running in a low speed (such as below 20 km per hour), the clutch-type electric generator 3 cannot be activated to generate electricity. In order to overcome the disadvantage of the clutch-type electric generator 3 as mentioned above, the inventor of the present invention is then focusing on how to enable the automobile to efficiently utilize the vibration continuously generated by a suspension system thereof no matter the automobile is running in a low or high speed, so as to effectively enhance the energy utilization efficiency of the automobile, which is also a crucial topic to be solved in the present invention.

BRIEF SUMMARY OF THE INVENTION

As long as the automobile is running, it is hard to prevent the automobile from vibration caused by the rough road surface, so the inventor designs a vibration-type electric generator applied to an automobile suspension system of the present disclosure based on long-term practical experience and many researches and tests. Through utilizing the vibration-type electric generator, the vibration energy constantly generated by the automobile during driving in any speed can be converted to electric energy, so the energy utilization efficiency can be significantly enhanced.

An objective of the present disclosure is to provide a vibration-type electric generator applied to the automobile suspension system. The vibration-type electric generator includes an electric generator, two one way bearings and a hydraulic system. The electric generator includes a casing, at least one stator base, and at least one rotor base. An outer rim of the casing is fixed on the automobile, and the stator base is fixed at the inner rim of the casing and includes a plurality of stators disposed along a perimeter of the inner rim of the casing. The rotor base is rotatably installed inside the casing and includes a plurality of rotors disposed along the perimeter. The plurality of rotors correspond to the plurality of stators, respectively, and in a case of the rotor base being rotated, the plurality of rotors can generate a time-varying magnetic field and electricity can be induced on the plurality of stators. Shafts of the two one way bearings are fixedly linked to a shaft of the rotor base, respectively. While the two one way bearings are driven to rotate toward the same direction, the rotor base can be driven simultaneously to rotate toward the same direction, and to enable subsequently the plurality of rotors to generate the induced electricity on the plurality of stators. The hydraulic system is pivotally connected to a first suspension member (such as an upper hinge member of a shock absorber) and a second suspension member (such as a lower hinge member of the shock absorber). The first and second suspension members generates relative movement in response to the vibration of the automobile, to simultaneously generates two forces to respectively drive the plurality of one way bearings and shaft thereof to rotate toward the same direction. Thus, no matter the automobile is running in a low or high speed, the vibration-type electric generator can keep generating electricity through utilizing the vibration constantly transmitted from the suspension system, and the electric energy is stored in a power module for power consumption of interior apparatus.

Another objective of the present disclosure is that a hydraulic system includes a first hydraulic acting cylinder. The first hydraulic acting cylinder includes a first cylinder, a first piston and a first connecting rod, and the first cylinder is pivotally connected to the first suspension member at en end thereof, and is filled with liquid therein, and configured with first drainage holes respectively disposed near two ends thereof. Each of the first drainage holes is used to guide the liquid into the first cylinder or drain the liquid out of the first cylinder. The first piston is movably installed in the first cylinder, an end of the first connecting rod is connected with the first piston, and other end of the first connecting rod is exposed out of the first cylinder and pivotally connected to the second suspension member. The first and second suspension members can generate relative movement in response to the vibration of the automobile, to subsequently drive the first connecting rod and the first piston at an end thereof, so that a side of the first piston can push the liquid corresponding thereto in the first cylinder to drain the liquid out of the first cylinder via one of the first drainage holes and, in the meantime, other side of the first piston can guide liquid into the first cylinder via other of the first drainage holes.

Another objective of the present disclosure is that the hydraulic system further includes two second hydraulic acting cylinders, and each of the two second hydraulic acting cylinders includes a second cylinder, a second piston, and a second connecting rod. The second cylinder is pivotally connected to the casing at an end thereof, and is filled with the liquid therein. The second cylinder is configured with second drainage holes disposed near ends thereof, and the second drainage holes are communicated with the first drainage holes, respectively, and used to guide the liquid into the second cylinder from the first cylinder or guide the liquid into the first cylinder from the second cylinder. The second piston is movably installed in the second cylinder, an end of the second connecting rod is connected to the second piston, and other end of the second connecting rod is exposed out of the second cylinder and pivotally connected to the outer rims of the one way bearings. When the first and second suspension members generate relatively movement in response to the vibration of the automobile, the first piston guides the liquid in the first cylinder to flow into the second cylinder via the corresponding first drainage hole and the second drainage hole in order or guides the liquid in the second cylinder to return to the first cylinder, to simultaneously drive the two one way bearings and the shafts thereof to rotate toward the same direction, whereby the rotor can keep rotating to enable the stator to generate stable induced electricity.

BRIEF DESCRIPTION OF DRAWINGS

The structure as well as a preferred mode of use, further objects and advantages of the present invention will be best understood by referring to the following detailed description of some illustrative embodiments in conjunction with the accompanying drawings, in which.

DETAILED DESCRIPTION OF THE INVENTION

The principles, structural features and purposes of the present invention may be more fully understood by the subsequent detailed description and examples with references made to the accompanying drawings.

The present disclosure illustrates a vibration-type electric generator applied to an automobile suspension system. Please refer to FIG. 3 which shows a first preferred embodiment of the present disclosure. The vibration-type electric generator includes an electric generator 5, two one way bearings 6, and a hydraulic system 7. Please refer to FIG. 4 which shows a section view A-A of the electric generator 5 and the one way bearings 6. The electric generator 5 includes a casing 50, at least one stator base 51, and at least one rotor base 50. Please refer back to the FIG. 3. The outer rim of the casing 50 is fixed on the automobile 1, and the stator base 51 is fixed at the inner rim of the casing 50 and includes a plurality of stators 510 disposed along a perimeter of the inner rim of the casing. The rotor base 52 is rotatably installed inside the casing 50 and includes a plurality of rotors 520 disposed along the perimeter. The plurality of rotors 520 correspond to the plurality of stators 510, respectively. In a case of the rotor base 52 being rotated, the plurality of rotors 520 can generate a time-varying magnetic field and subsequently the electricity can be induced 510 on the plurality of stators. Please refer to FIG. 4 and FIG. 5 which show section views A-A and B-B of the one way bearing 6. The shafts S of the two one way bearings 6 are fixedly linked with the shaft S of the rotor base 52, respectively. In an embodiment of the present disclosure, one common shaft S is shared to the two one way bearings 6 and the rotor base 52, but the practical implementation of the present disclosure is not limited thereto. The shaft S can be one or more in number. No matter whether the one way bearings 6 share one shaft S, as long as when the one way bearings 6 are driven to rotate toward one direction respectively, the one or more shaft S can be simultaneously driven to rotate the rotor base 52 toward the same direction, and subsequently drive the rotors 520 to generate the induced electricity on the stators 510, the one or more shafts S are included in the shaft S of the present disclosure.

Please refer back to the FIG. 3 and FIG. 4. The hydraulic system 7 is pivotally connected to the first suspension member 11 (such as an upper hinge member of a shock absorber) and a second suspension member 12 (such as a lower hinge member of the shock absorber). The first suspension member 11 and the second suspension member 12 can generate relative movement in response to the vibration of the automobile 1, to subsequently enable the hydraulic system 7 to continuously generate two forces to respectively drive the plurality of one way bearings 6 and shafts S thereof to rotate toward the same direction. Thus, no matter the automobile 1 is running in a low or high speed, the vibration-type electric generator can keep generating electricity through utilizing the vibration constantly transmitted from the suspension system (i.e., the first suspension member 11 and the second suspension member 12), and the electric energy is stored in a power module (not shown in FIGs) for the consumption of interior equipment. It should be particularly noted that in the embodiment shown in FIG. 3 the hydraulic system 7 is respectively pivotally connected to the upper hinge member (i.e., the first suspension member 11) of the shock absorber of the automobile 1 and the lower hinge member (i.e., the second suspension member 12), but the implementation of the present disclosure is not limited thereto. The so-called suspension members in the present disclosure can be other kind of suspension members of the automobile 1 which are pivotally connected to the hydraulic system 7 respectively, and the other suspension members can generate relative movement in response to the vibration of the automobile 1, to subsequently continuously generate two forces to respectively drive the one way bearings 6 and the shafts S thereof to rotate toward the same direction.

Figure 3:
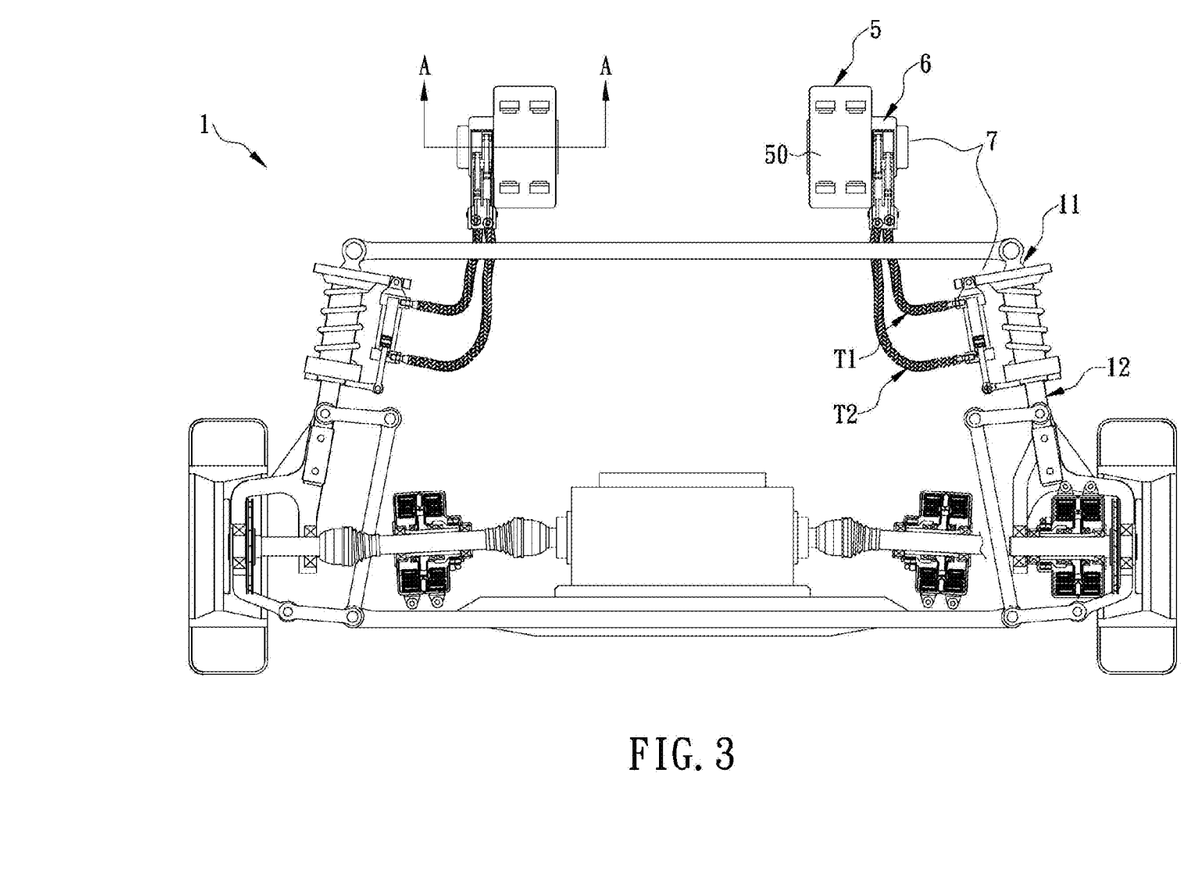
FIG. 3 is a schematic view of a vibration-type electric generator of the present disclosure.
Figure 4:
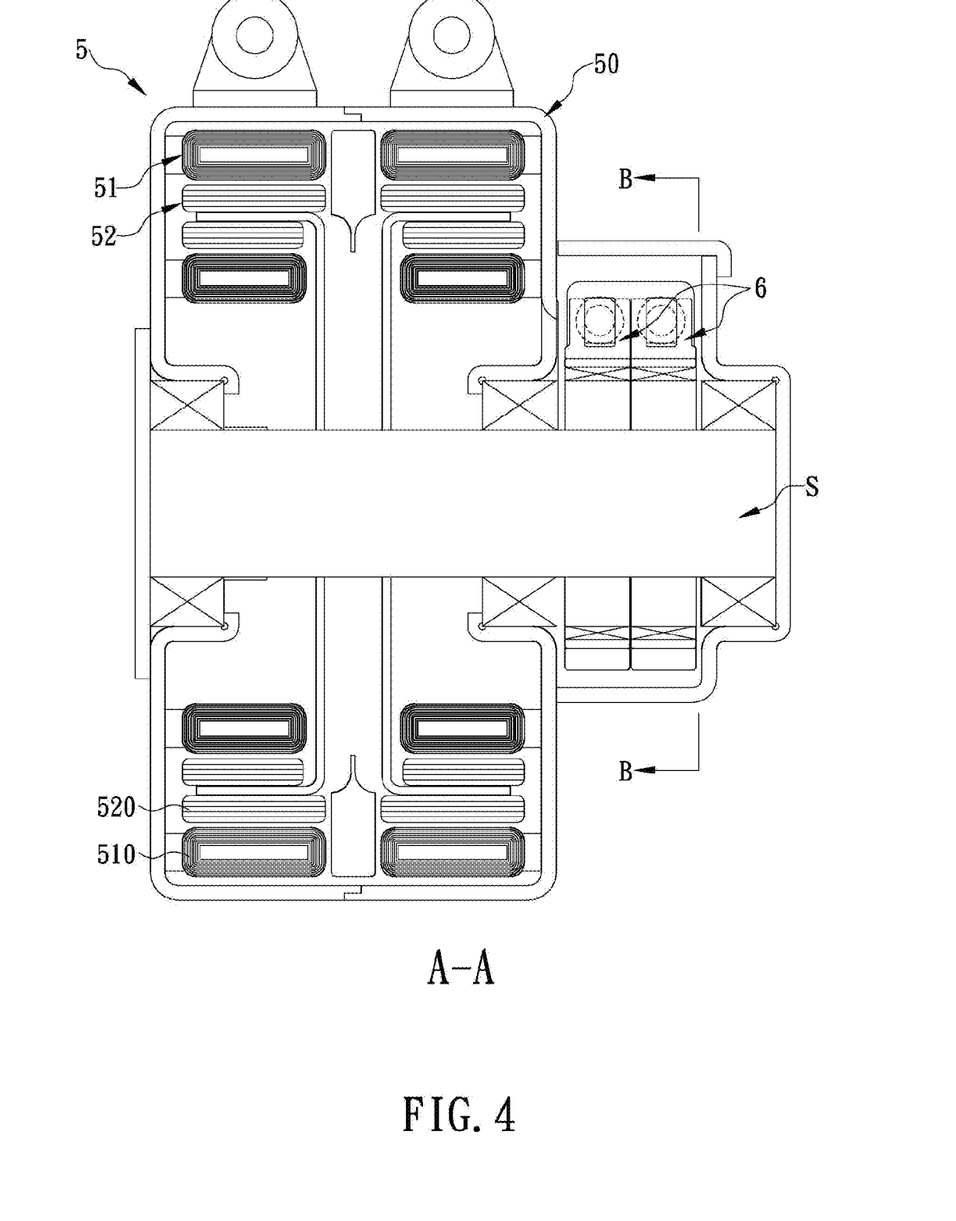
FIG. 4 is a section view A-A of an electric generator and one way bearing of the vibration-type electric generator of the present disclosure.
Figure 6:
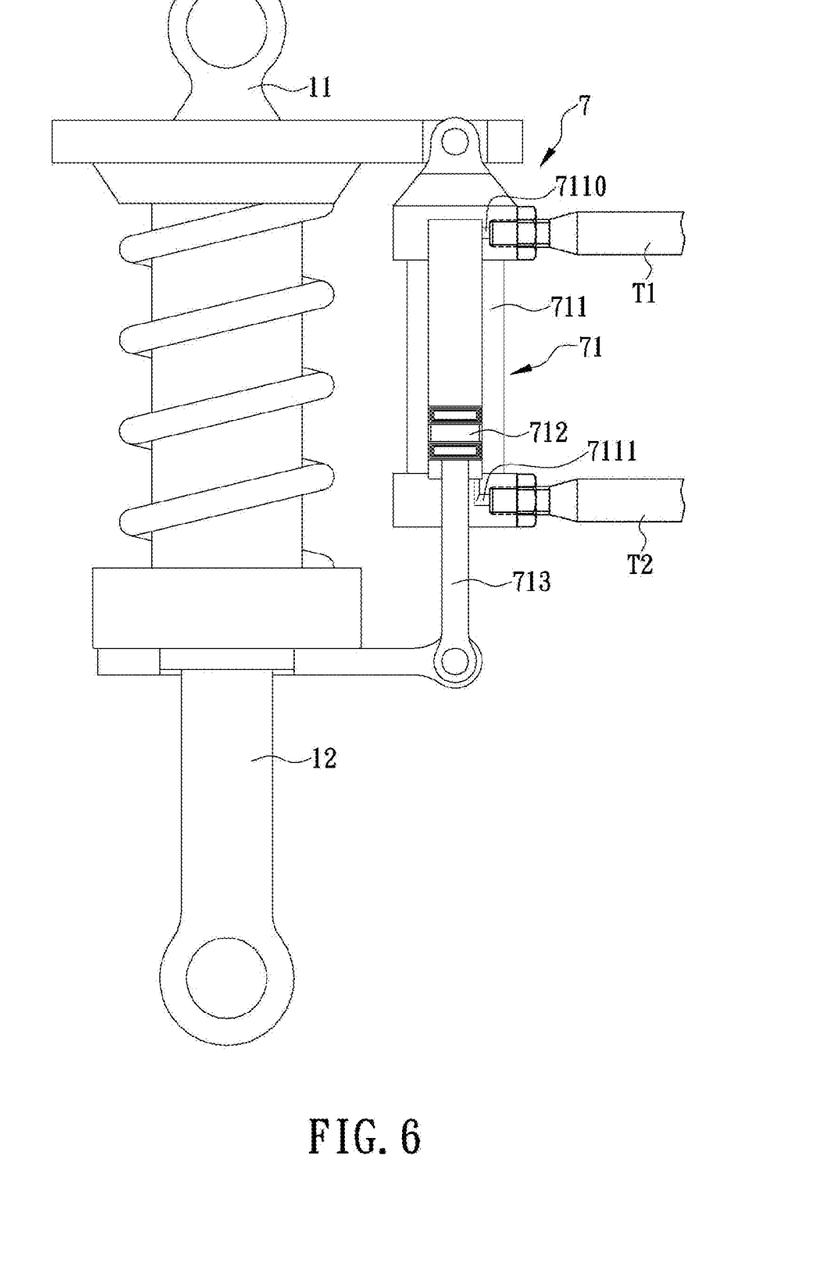
FIG. 6 is an assembly and partial section view of a first hydraulic acting cylinder and an automobile suspension system of the vibration-type electric generator of the present disclosure.

Please refer to FIG. 3 and FIG. 6. In a second preferred embodiment of the present disclosure, the hydraulic system 7 includes a first hydraulic acting cylinder 71 which is a double acting cylinder and includes a first cylinder 711, a first piston 712 and a first connecting rod 713. An end of the first cylinder 711 is pivotally connected to the first suspension member 11. The first cylinder 711 is filled with liquid therein, and configured with first drainage holes 7110 and 7111 respectively disposed near two ends thereof. Each of the first drainage holes 7110 and 7111 is used to guide the liquid into the first cylinder 711, or drain the liquid out of the first cylinder 711. The first piston 712 is movably installed in the first cylinder 711, an end of the first connecting rod 713 is connected to the first piston 712, and other end of the first connecting rod 713 is exposed out of the first cylinder 711 and pivotally connected to the second suspension member 12. The first suspension member 11 and the second suspension member 12 can generate relative movement in response to the vibration of the automobile 1, to subsequently drive the first connecting rod 713 and the first piston 712 at an end thereof, so that a side of the first piston 712 can push the liquid corresponding thereto in the first cylinder 711 to drain the liquid out of the first cylinder 711 via the first drainage hole 7110 and, in the meantime, other side of the first piston 712 can guide liquid into the first cylinder 711 via other first drainage hole 7111, vice versa.

Figure 5:
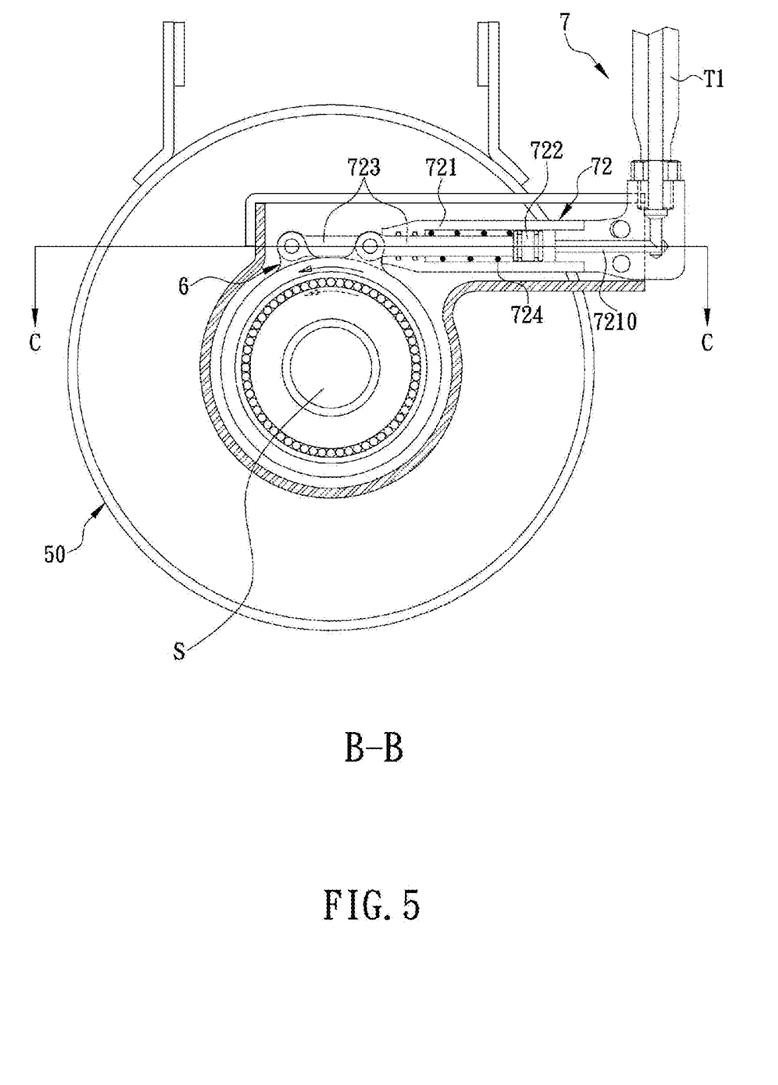
FIG. 5 is a section view B-B of the one way bearing and a second hydraulic acting cylinder of the vibration-type electric generator of the present disclosure.

Please refer to FIG. 4 through FIG. 7. In the second preferred embodiment, the hydraulic system 7 further includes two second hydraulic acting cylinders 72, and each of the two second hydraulic acting cylinders 72 is a single acting cylinder and includes a second cylinder 721, a second piston 722, and a second connecting rod 723. The second cylinder 721 is pivotally connected to the casing 50 at an end thereof and is filled the liquid therein. The second cylinder 721 is configured with second drainage holes 7210 disposed near two ends thereof. Please refer back to FIG. 3. The second drainage holes 7210 are communicated with the first drainage holes 7110 and 7111 via two hydraulic tubes T1 and T2, respectively, and used to guide the liquid into the second cylinder 721 from the first cylinder 711 or guide the liquid into the first cylinder 711 from the second cylinder 721. The second piston 722 is movably installed in the second cylinder 721, an end of the second connecting rod 723 is connected to the second piston 722, as shown in FIG. 5, and other end of the second connecting rod 723 is exposed out of the second cylinder 721 and pivotally connected to the outer rims of the one way bearings 6. Please refer back to FIG. 5 and FIG. 6. When the first suspension member 11 and the second suspension member 12 generate relatively movement in response to the vibration of the automobile 1, the first piston 722 guides the liquid in the first cylinder 711 to flow into the second cylinder 721 via the first drainage hole 7110 and the second drainage hole 7210 corresponding thereto in order or guides the liquid in the second cylinder 721 to return to the first cylinder 711, to drive the two one way bearings 6 and the shafts S thereof to rotate toward the same direction, whereby the rotors 520 can keep rotating to enable the stators 510 to generate stable induced electricity. It should be particularly noted that in the embodiment shown in FIG. 4 and FIG. 7 the second hydraulic acting cylinders 72 are respectively installed at a side of the casing 50 of the electric generator 5, but the practical implementation of the present disclosure is not limited thereto. The second hydraulic acting cylinders 72 can be installed at two opposite sides of the casing 50 of the electric generator 5, respectively.

Please refer back to FIG. 4 through FIG. 7. In the second preferred embodiment, the second hydraulic acting cylinder 72 further includes a reset spring 724 which is installed in an end of the second cylinder 721 away from of the second drainage hole 7210 and disposed around the connecting rod 723, so the two ends of the reset spring 724 can press against an inner wall of the second cylinder 721 and the second piston 722, respectively, to apply a counterforce on the second piston 722 to restore the second piston 722 to an original status. At this time, the second hydraulic acting cylinder 72 is also called a single acting spring return cylinder. Thus, when the first piston 712 guides the liquid in the first cylinder 711 to flow into the second cylinder 721 via the first drainage hole 7110 and the second drainage hole 7210 corresponding thereto, the second piston 722 in the second cylinder 721 drives the second connecting rod 723 to apply a force on the outer rims of the one way bearings 6 to rotate the one way bearings 6 and the shafts S thereof toward the same direction; on the contrary, when the first piston 712 guides the liquid to return to the first cylinder 711 via the second drainage hole 7210 and the first drainage hole 7110 corresponding thereto in order, the second piston 722 in the second cylinder 721 enables the one way bearings 6 to reversely rotate for restoring to the initial position due to the counterforce of the reset spring 724, but the shafts S of the one way bearings 6 are not rotated reversely. Accordingly, in the case that the one way bearings 6 cyclically and constantly drive the shafts S to rotate toward the same direction, the rotor 520 can keep rotating to enable the stators 510 to generate stable induced electricity.

Figure 7:
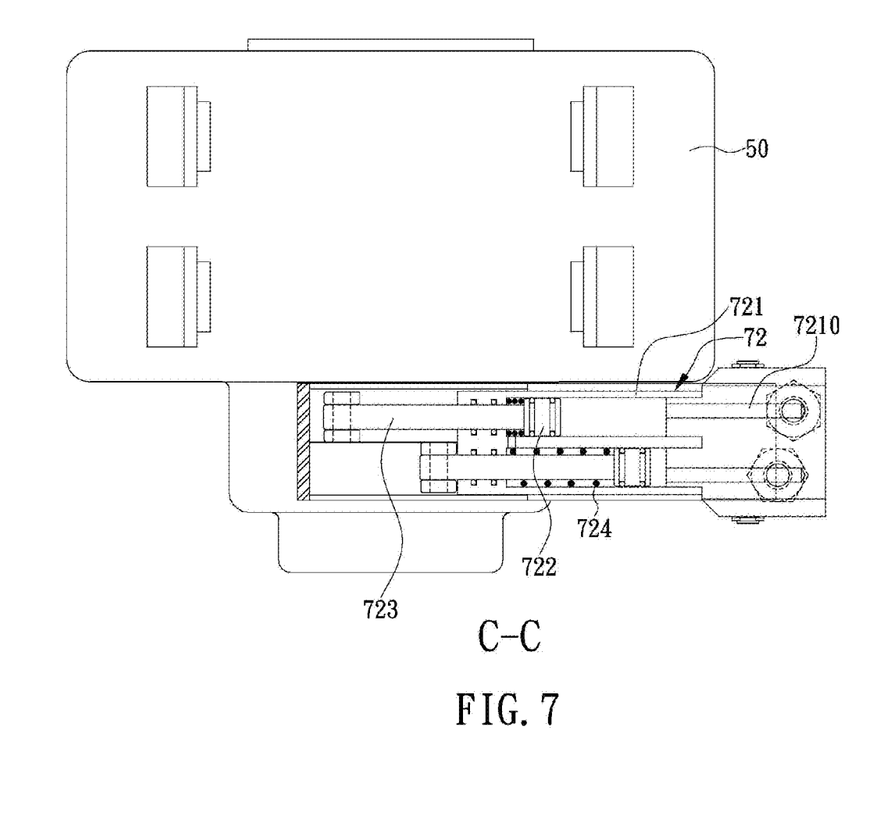
FIG. 7 is another section view C-C of the second hydraulic acting cylinder of the vibration-type electric generator of the present disclosure.
Figure 8:
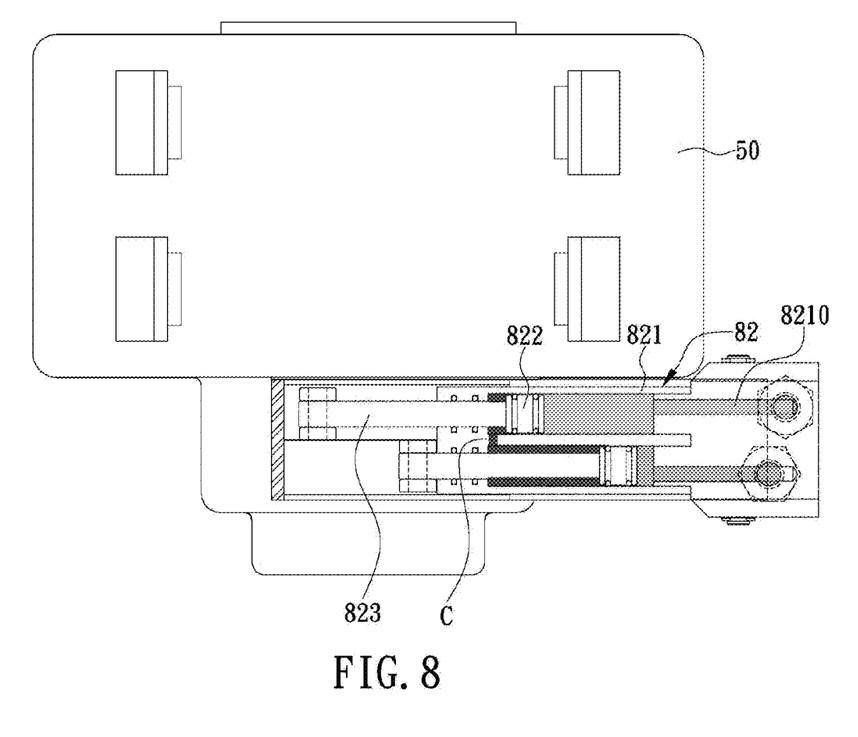
FIG. 8 is a section view C-C of other embodiment of the second hydraulic acting cylinder of the present disclosure.

Please refer to FIG. 6 through FIG. 8. In a third preferred embodiment of the present disclosure, each of the second hydraulic acting cylinders 72 can be replaced by a double acting cylinder, as a second hydraulic acting cylinder 82 shown in FIG. 8. A flowing channel C is formed between the second hydraulic acting cylinders 82, and the flowing channel C is configured between the ends of the second cylinders 821 away from the second drainage holes 8210, so that the liquid in other sides of the second pistons 822 inside the second cylinder 821 (i.e. the side away from the second drainage hole 8210) can be flowed together. At this time, the second hydraulic acting cylinders 82 are also called "simultaneous double acting cylinder". Thus, when the first piston 712 guides the liquid in the first cylinder 711 to flow into a side of the second piston 822 in the second cylinder 821 via the first drainage hole 7110 and the second drainage hole 8210 corresponding to each other, the second piston 822 drives the second connecting rod 823 to apply a force on the outer rims of the one way bearings 6 to rotate the one way bearings 6 and the shafts S thereof toward the same direction. The second piston 822 also guides the liquid at other side thereof to flow into another second cylinder 821 adjacent thereto via the flowing channel C; on the contrary, when the first piston 712 guides the liquid to return to the first cylinder 711 via the second drainage hole 8210 and the first drainage hole 7110 corresponding thereto in order, the liquid returned from the other second cylinder 821 via the flowing channel C enables the second piston 822 in the second cylinder 821 to restore to the initial position, and subsequently enable the one way bearings 6 to reversely rotate for restoring to the initial position, but the shafts S of the one way bearings 6 are not rotated reversely. Accordingly, in the case that the one way bearings 6 cyclically and constantly drive the shafts S to rotate toward the same direction, the rotors 520 can keep rotating to enable the stators 510 to generate the stable induced electricity.

In summary, no matter the automobile 1 is running in a low or high speed, it is hard for the automobile 1 to prevent from continuous vibration caused by the rough of the road surface and, at this time, the suspension system (i.e., the first suspension member 11 and the second suspension member 12) of the automobile 1 continuously absorbs the vibration, so the reciprocating movement is continuously generated between the first suspension member 11 and the second suspension member 12, and subsequently the liquid in the first cylinder 711 is forced to flow into the second cylinders 721 and 821, or the liquid in the second cylinders 721 and 821 is forced to flow into the first cylinder 711. Through utilizing aforesaid repeated operations, the second connecting rods 723 and 823 on the second hydraulic acting cylinders 72 and 82 can continuously generate two forces to drive the one way bearings 6 and the shafts S thereof to rotate toward the same direction, respectively, so that the electric generator 5 can continuously generate electric energy to supply power to the interior equipment of the automobile 1.

While the present invention herein disclosed has been described by means of specific embodiments, numerous modifications and variations could be made thereto by those skilled in the art without departing from the scope of the invention set forth in the claims.

What is claimed is:

1. A vibration-type electric generator applied to an automobile suspension system, comprising:
    an electric generator, comprising a casing, at least one stator base and at least one rotor base, wherein an outer rim of the casing is fixed on an automobile, the stator base is fixed at the inner rim of the casing and comprises a plurality of stators disposed along a perimeter of the inner rim of the casing, the rotor base is rotatably installed inside the casing and comprises a plurality of rotors disposed along the perimeter, and the plurality of rotors correspond to the plurality of stators respectively, such that when the rotor base being rotated, the plurality of rotors generate a time-varying magnetic field to induce electricity on the plurality of stators;
    two one way bearings, each having a shaft fixedly linked to a shaft of the rotor base, wherein when the two one way bearings and the shafts thereof are driven to rotate toward the same direction, respectively, the rotor base is driven simultaneously to rotate toward the same direction and subsequently enables the plurality of rotors to generate the induced electricity on the plurality of stators; and
    a hydraulic system, pivotally connected to a first suspension member and a second suspension member on the automobile, wherein the first and second suspension members generate relative movement in response to the vibration of the automobile, so as to subsequently generate two forces to drive the plurality of one way bearings and the shafts thereof to rotate toward the same direction.

2. The vibration-type electric generator as defined in claim 1, wherein the hydraulic system comprises a first hydraulic acting cylinder which is a double acting cylinder and comprises a first cylinder, a first piston and a first connecting rod, the first cylinder pivotally is connected to the first suspension member at an end thereof and is filled with liquid inside, and configured with first drainage holes respectively disposed near two ends thereof, each of the first drainage holes is used to guide the liquid into the first cylinder or drain the liquid out of the first cylinder, the first piston is movably installed in the first cylinder, an end of the first connecting rod is connected with the first piston, other end of the first connecting rod is exposed out of the first cylinder and pivotally connected to the second suspension member, the first and second suspension members can generate relative movement in response to the vibration of the automobile, to subsequently drive the first connecting rod and the first piston at an end thereof, so that a side of the first piston can push the liquid corresponding thereto in the first cylinder to drain the liquid out of the first cylinder via one of the first drainage holes and, in the meantime, other side of the first piston guides liquid into the first cylinder via other of the first drainage holes.

3. The vibration-type electric generator as defined in claim 2, wherein the hydraulic system further comprises two second hydraulic acting cylinders, and each of the two second hydraulic acting cylinders comprises a second cylinder, a second piston and a second connecting rod, the second cylinder is pivotally connected to the casing at an end thereof and filled with the liquid therein, and configured with second drainage holes disposed near two ends thereof, and the second drainage holes are communicated with the first drainage holes respectively and used to guide the liquid into the second cylinder via the first drainage holes corresponding thereto, or guide the liquid in the second cylinder to the first drainage hole corresponding thereto, the second piston is movably installed in the second cylinder, an end of the second connecting rod is connected to the second piston, and other end of the second connecting rod is exposed out of the second cylinder and pivotally connected to the outer rims of the one way bearings, and when the first and second suspension members generate relatively movements in response to the vibration of the automobile, the first piston guides the liquid in the first cylinder to flow into the second cylinder via the first drainage holes and the second drainage holes corresponding thereto in order or guides the liquid in the second cylinder to return to the first cylinder, so as to drive the two one way bearings and the shafts thereof to rotate toward the same direction, whereby the rotors can keep rotating to enable the stators to generating stable induced electricity.

4. The vibration-type electric generator as defined in claim 3, wherein the second hydraulic acting cylinder is a single acting cylinder, and comprises a reset spring which is installed in an end of the second cylinder away from an the second drainage hole and disposed around the connecting rod, so the two ends of the reset spring can press against an inner wall of the second cylinder and the second piston, respectively, to apply a counterforce on the second piston to restore the second piston to an original status.

5. The vibration-type electric generator as defined in claim 3, wherein each of the second hydraulic acting cylinders is a double acting cylinder, a flowing channel is formed between the second hydraulic acting cylinders and configured between inner sides of the ends of the second cylinders away from the second drainage holes, to enable the liquid at sides of the second pistons away from the second drainage holes in the second cylinders can be flowed with each other.

6. The vibration-type electric generator as defined in claim 4, wherein the second hydraulic acting cylinders are installed at two opposite sides of the casing.

7. The vibration-type electric generator as defined in claim 5, wherein the second hydraulic acting cylinders are installed at two opposite sides of the casing.

8. The vibration-type electric generator as defined in claim 4, wherein the second hydraulic acting cylinders are installed at a side of the casing.

9. The vibration-type electric generator as defined in claim 5, wherein the second hydraulic acting cylinders are installed at a side of the casing.

10. The vibration-type electric generator as defined in claim 6, wherein each of the plurality of stators is a coil, and each of the plurality of rotors is a field magnet.

11. The vibration-type electric generator as defined in claim 7, wherein each of the plurality of stators is a coil, and each of the plurality of rotors is a field magnet.

12. The vibration-type electric generator as defined in claim 8, wherein each of the plurality of stators is a coil, and each of the plurality of rotors is a field magnet.

13. The vibration-type electric generator as defined in claim 9, wherein each of the plurality of stators is a coil, and each of the plurality of rotors is a field magnet.

\* \* \* \* \*